(12) United States Patent
Toyoda

(10) Patent No.: US 9,130,495 B2
(45) Date of Patent: Sep. 8, 2015

(54) CONTROL SYSTEM FOR BRUSHLESS MOTOR

(71) Applicant: DENSO CORPORATION, Kariya (JP)

(72) Inventor: Hirokazu Toyoda, Nakata-gun (JP)

(73) Assignee: DENSO CORPORATION, Kariya (JP)

( * ) Notice: Subject to any disclaimer, the term of this patent is extended or adjusted under 35 U.S.C. 154(b) by 125 days.

(21) Appl. No.: 13/950,539

(22) Filed: Jul. 25, 2013

(65) Prior Publication Data

US 2014/0077734 A1    Mar. 20, 2014

(30) Foreign Application Priority Data

Sep. 20, 2012   (JP) ................................. 2012-207395

(51) Int. Cl.
*H02P 6/04* (2006.01)
*H02P 6/20* (2006.01)
*H02P 6/18* (2006.01)
*H02P 6/22* (2006.01)

(52) U.S. Cl.
CPC ............... *H02P 6/205* (2013.01); *H02P 6/182* (2013.01); *H02P 6/22* (2013.01)

(58) Field of Classification Search
USPC ................ 318/400.1, 400.11, 254, 445, 560
See application file for complete search history.

(56) References Cited

U.S. PATENT DOCUMENTS

| | | | |
|---|---|---|---|
| 5,623,379 A | 4/1997 | Nishimura et al. | |
| 2001/0035724 A1* | 11/2001 | Tanaka et al. | 318/445 |
| 2003/0189414 A1* | 10/2003 | Muroi et al. | 318/254 |
| 2003/0205982 A1* | 11/2003 | Tanaka et al. | 318/560 |
| 2006/0186843 A1 | 8/2006 | Hattori et al. | |
| 2008/0048598 A1* | 2/2008 | Shibuya | 318/400.1 |
| 2009/0174350 A1 | 7/2009 | Kuroda et al. | |
| 2009/0212481 A1* | 8/2009 | Takayama | 271/10.11 |

FOREIGN PATENT DOCUMENTS

| | | |
|---|---|---|
| JP | 06-022588 A | 1/1994 |
| JP | 07-087784 A | 3/1995 |
| JP | H07-337080 A | 12/1995 |
| JP | 10-191682 A | 7/1998 |
| JP | H11-318096 A | 11/1999 |
| JP | 2007-174747 A | 7/2007 |
| JP | 2008-220078 A | 9/2008 |
| JP | 2009-268169 A | 11/2009 |
| JP | 2010-17044 A | 1/2010 |
| JP | 2010-233342 A | 10/2010 |

OTHER PUBLICATIONS

Office Action mailed Aug. 19, 2014 in the corresponding JP application No. 2012-207395 (with English translation).

* cited by examiner

*Primary Examiner* — Paul Ip
(74) *Attorney, Agent, or Firm* — Posz Law Group, PLC (57) ABSTRACT

A motor controller is configured to perform positioning of a rotor of a brushless motor immediately when power supply is turned on, and not after actually receiving a target value related to control for the brushless motor from a main ECU, which determines the target value. The motor controller finishes or is performing the rotor positioning, when the target value is received from the main ECU. For this reason, the motor controller can start rotation control for the brushless motor in accordance with the received target value in a short period of time.

9 Claims, 6 Drawing Sheets

CONTROL SYSTEM FOR BRUSHLESS MOTOR

CROSS REFERENCE TO RELATED APPLICATION

This application is based on and incorporates herein by reference Japanese patent application No. 2012-207395 filed on Sep. 20, 2012.

FIELD

The present disclosure relates to a control system for a brushless motor, which has a rotor made of a permanent magnet set and a stator coil set of plural phase coils.

BACKGROUND

As disclosed in the following patent documents 1 and 2, for example, conventional control systems for a brushless motor is configured to position a rotor to a predetermined angular position before driving a brushless motor thereby to ensure starting of the brushless motor. According to the conventional system disclosed in patent document 1, a rotor is positioned by supplying a DC current from a specified one phase coil (W-phase) to the other phase coils (U-phase and V-phase) of a stator coil set forming a motor by an inverter circuit. According to the conventional system disclosed in patent document 2, a rotor is positioned by supplying a current from a specified one phase to the other phase of a stator coil set two times while changing phases of the stator coil set. Thus, even when a rotation angular position of a rotor is near an electrical angle at an angle 180° (dead point), at which the rotor is uncontrollable relative to a final angle to be positioned, the rotor is made to be controllable to the final angle.

[Patent document 1] JP-A-2009-268169
[Patent document 2] JP-A-2009-165297 (US 2009/0174350 A1)

It is assumed here as one example that a brushless motor control system has a main ECU and a motor controller separately. The main ECU is provided to determine an output a target value (for example, a target rotation speed) related to control for a brushless motor. The motor controller is provided to control current supply to the brushless motor actually.

When electric power is supplied to this control system to start its motor control operation, the main ECU calculates a target value for controlling the brushless motor based on signals of various sensors and switches and transmits a calculated target value to the motor controller. The motor controller recognizes, upon receiving the target value, that the brushless motor need be started to operate. The motor controller positions the rotor first and then controls a rotation state of the brushless motor in accordance with a received target value.

According to the control system described above, after the power supply is started and before the brushless motor is started to operate, it is required to perform many processing, which includes target value calculation by the main ECU, target value transmission from the main ECU to the motor controller, rotor positioning by the motor controller and the like. Thus the control system needs long time before the brushless motor is actually started and brushless motor starting performance is low.

SUMMARY

It is an object to provide a control system, which shortens a time period from power supply to an operation start of a brushless motor even in a case that a main ECU for determining a target value related to brushless motor control and a motor controller for actually controlling the brushless motor are provided separately.

According to one aspect, a control system for a brushless motor having a rotor made of a permanent magnet set and a stator coil set of plural phase coils is provided with a main ECU, a position detection section and a motor controller. The main ECU is configured to determine a target value related to control for the brushless motor. The position detection section is configured to detect a rotation position of the rotor. The motor controller is configured to perform rotor positioning processing for the rotor by supplying a current to a specified phase coil of the stator coil set, and to switch over phase coils of the stator coil set, to which a current is supplied, in accordance with the rotation position of the rotor detected by the position detection section so that rotation of the brushless motor is controlled in accordance with the target value outputted from the main ECU. The motor controller is configured further to perform the rotor positioning processing by supplying the current to at least the specified phase coil of the stator coil set before receiving the target value from the main ECU, when power supply is turned on.

EMBODIMENT

A control system for a brushless motor according to one embodiment will be described below with reference to the drawings. The brushless motor according to the embodiment may be used in a vehicle, for example, for driving a fuel pump, which suctions fuel stored in a fuel tank and supplies the fuel to a fuel injection system for an engine, or for driving a blower fan, which regulates amount of air blown off from an air-conditioner into a vehicle compartment. It is however noted that the brushless motor according to this embodiment is not limited to such use only.

Figure 1:
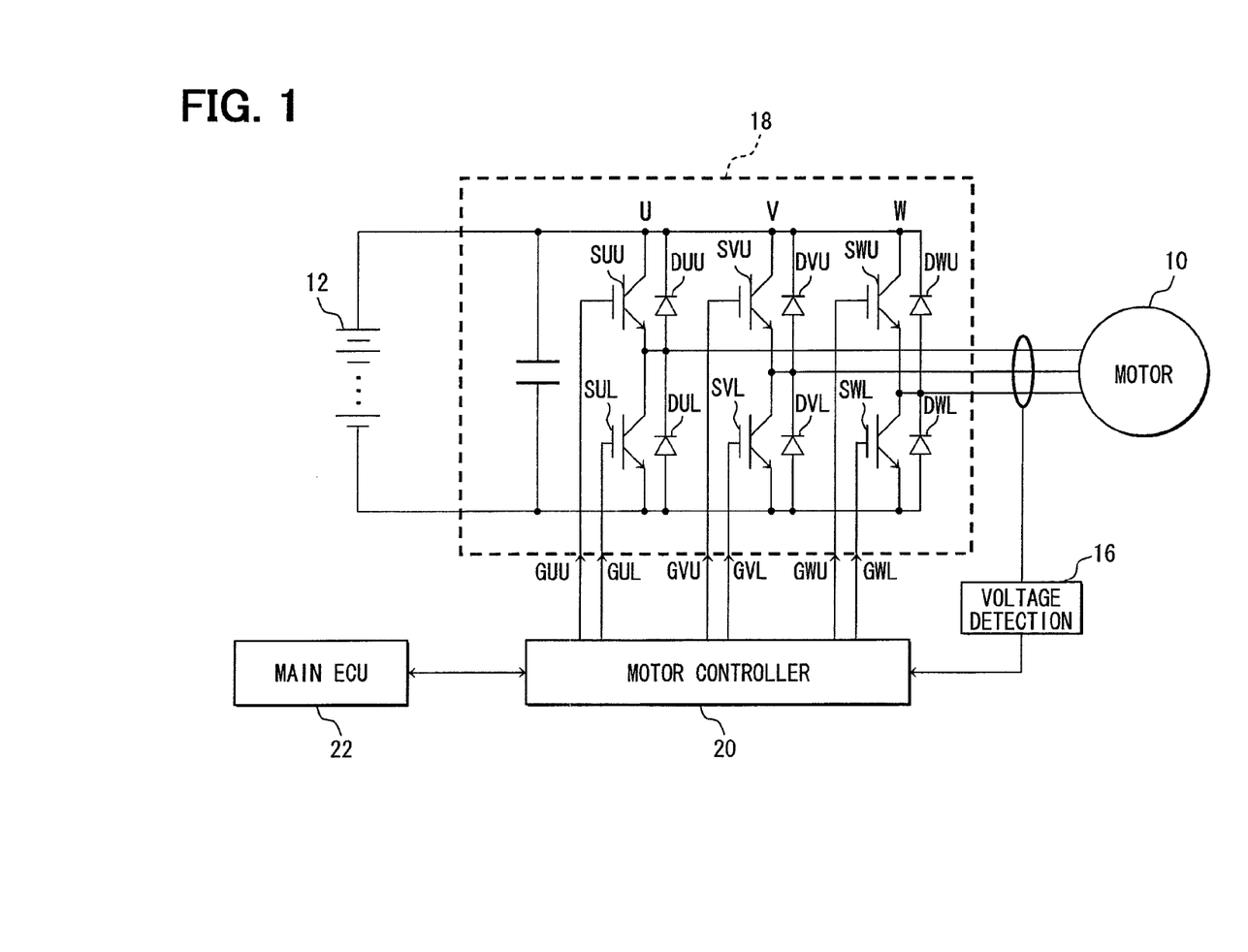
FIG. 1 is a circuit diagram showing an entire configuration of a control system for a brushless motor according to an embodiment.

Referring to FIG. 1, a brushless motor 10 is a three-phase permanent-magnet synchronous motor, which may for example be an implanted-magnet synchronous motor (IP-MSM). The brushless motor 10 is connected to a DC battery 12 through an inverter circuit 18. The inverter circuit 18 includes a series connection pair of switching elements SUU, SUL, a series connection pair of switching elements SVU, SVL and a series connection pair of switching elements SWU, SWL. Junctions in these series connection pairs are connected to a U-phase coil, a V-phase coil and a W-phase coil of the brushless motor 10, respectively. Each of the switching elements SUU, SUL, SVU, SVL, SWU, SWL is formed of an insulated-gate bipolar transistor (IGBT). Diodes DUU, DUL, DVU, DVL, DWU, DWL are connected in parallel to the switching elements SUU, SUL, SVU, SVL, SWU, SWL, respectively.

The control system has a voltage detection section 16, which detects induced voltages generated in phase coils, in which no driving current flows, among a stator coil set (U-phase coil, V-phase coil, W-phase coil) of the brushless motor 10. That is, rotation of the brushless motor 10 is controlled in a sensorless manner, by which an angular position of the rotor of the brushless motor 10 is detected and a current supply phase is switched over in accordance with the detected angular position. It is however possible to use an angular position sensor such as a Hall element.

The voltage detection section 16 outputs the induced voltage generated by each phase coil to a motor controller 20, which is an electronic control unit (ECU) configured to control the inverter circuit 18, after amplifying, wave-shaping, phase-shifting the induced voltage in the conventional manner. The motor controller 20 detects an angular position of the rotor based on the induced voltage of each phase inputted thereto. The motor controller 20 generates and outputs operation signals (PWM signals), which operate the inverter circuit 18, so that driving currents are supplied to current supply phases in accordance with the detected angular position of the rotor. The signals for operating the switching elements SUU, SUL, SVU, SVL, SWU, SWL of the inverter circuit 18 are on/off operation signals GUU, GUL, GVU, GVL, GWU, GWL, respectively.

The motor controller 20 further calculates a rotation speed of the brushless motor 10 and checks a rotation direction of the same based on a waveform of the induced voltage of each phase coil inputted from the voltage detection section 16. The motor controller 20, in addition to controlling the rotation of the brushless motor 10 by switching over current supply phases as described above, positions the rotor to a predetermined angular position by supplying a current to at least a coil of a specific phase before controlling the rotation of the brushless motor 10. This rotor positioning processing may be performed by outputting a DC current from a specified phase coil (W-phase) to the other phase coils (U-phase, V-phase) or by supplying a current from a specified one phase coil to the other phase coil two times while changing phases, as in the conventional manner.

Even in a case of the sensorless system, the angular position of the rotor can be set to the predetermined angular position by the rotor positioning processing. As a result, it becomes possible to drive the rotor to rotate in a desired rotation direction and to start the brushless motor 10 assuredly. In a case that an angular position sensor such as a Hall element is used, the rotor may rotate in a reverse direction or the brushless motor 10 cannot be started normally occasionally, even when current supply is started to a current supply phase in accordance with a position detected by the angular position sensor. This is caused depending on the power of resolution of the angular position sensor. For this reason, it is effective that the motor controller 20 performs the rotor positioning processing even in a case that the angular position sensor is provided.

The motor controller 20 is connected to a main electronic control unit (ECU) 22 through an in-vehicle LAN thereby to communicate each other in accordance with a communication protocol such as CAN protocol or UN protocol. The main ECU 22 determines a target value related to control for the brushless motor 10 and outputs the target value to the motor controller 20 through the communication network.

For example, in a case that the brushless motor 10 is used as a drive power supply source for a fuel pump, the main ECU 22 determines a target rotation speed of the brushless motor 10 and applies the target rotation speed to the motor controller 20 as a target value for rotation, which instructs rotation of the brushless motor 10. The target rotation speed is determined to be able to supply a required amount of fuel from a fuel pump to a fuel supply device based on an operation condition or an operation load of an engine of a vehicle. In a case that the brushless motor 10 is used to drive a blower fan, the main ECU 22 calculates a target rotation speed and outputs the calculated target rotation speed. When an amount of air is instructed by a passenger in a manual mode, the target rotation speed is calculated in accordance the instructed amount of air. When only a set temperature is instructed by a passenger in an automatic mode, an amount of air required to attain the set temperature is calculated and the target rotation speed is calculated in accordance the calculated amount of air. Depending on a field of use of the motor, it is likely that a target torque, for example, may be applied to the motor controller 20 as a target value for rotation in place of the target rotation speed.

When the target value is applied from the main ECU 22, the motor controller 20 controls rotation of the brushless motor 10 to attain the target value. For example, in a case that the target rotation speed is applied as the target value, the motor controller 20 controls voltages applied to each phase coil of the brushless motor 10 in response to the operation signals GUU, GUL, GVU, GVL, GWU, GWL so that the rotation speed of the brushless motor 10 equals the target rotation speed.

Figure 2:
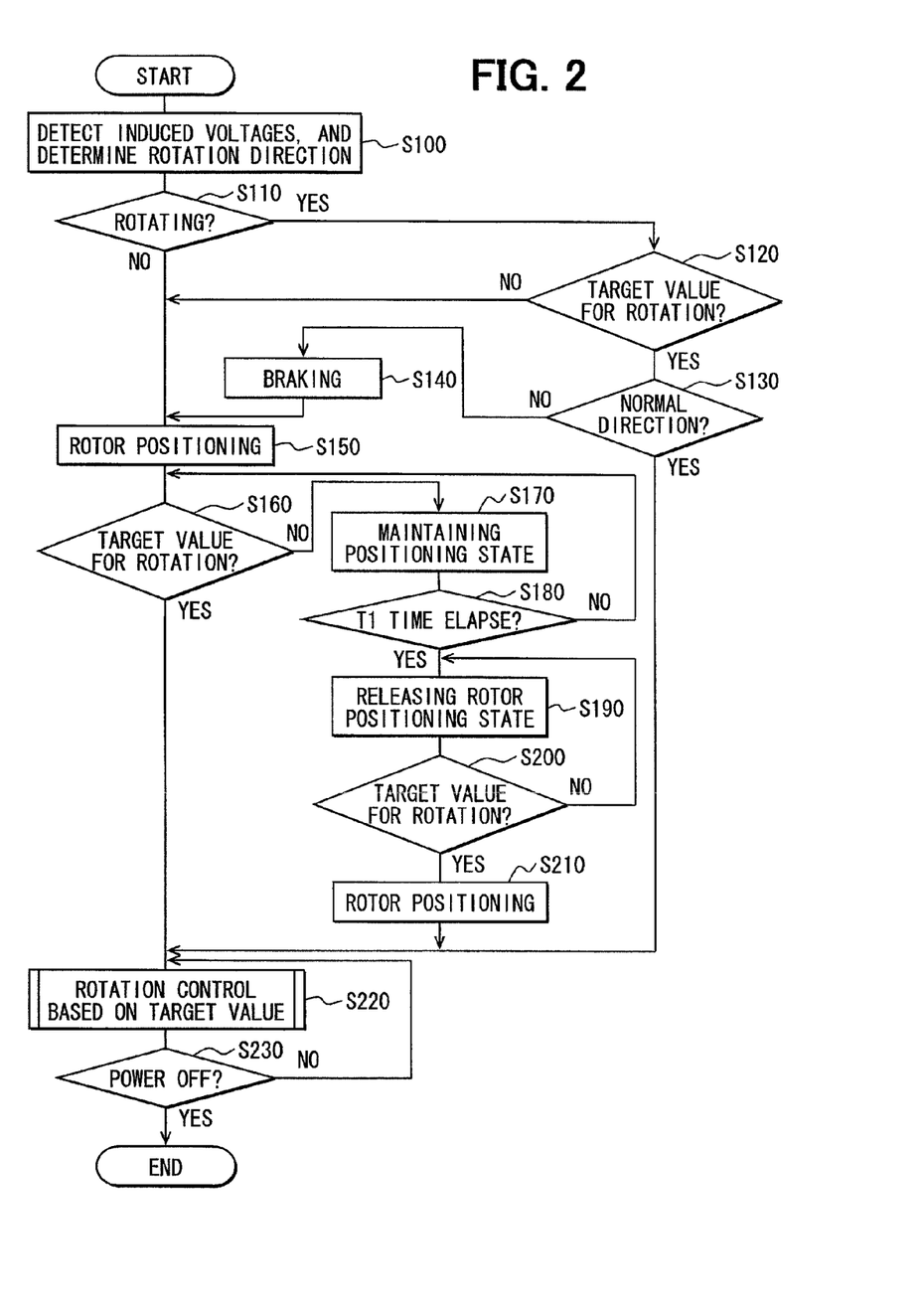
FIG. 2 is a flowchart showing control processing for a brushless motor performed by the motor controller.
Figure 3:
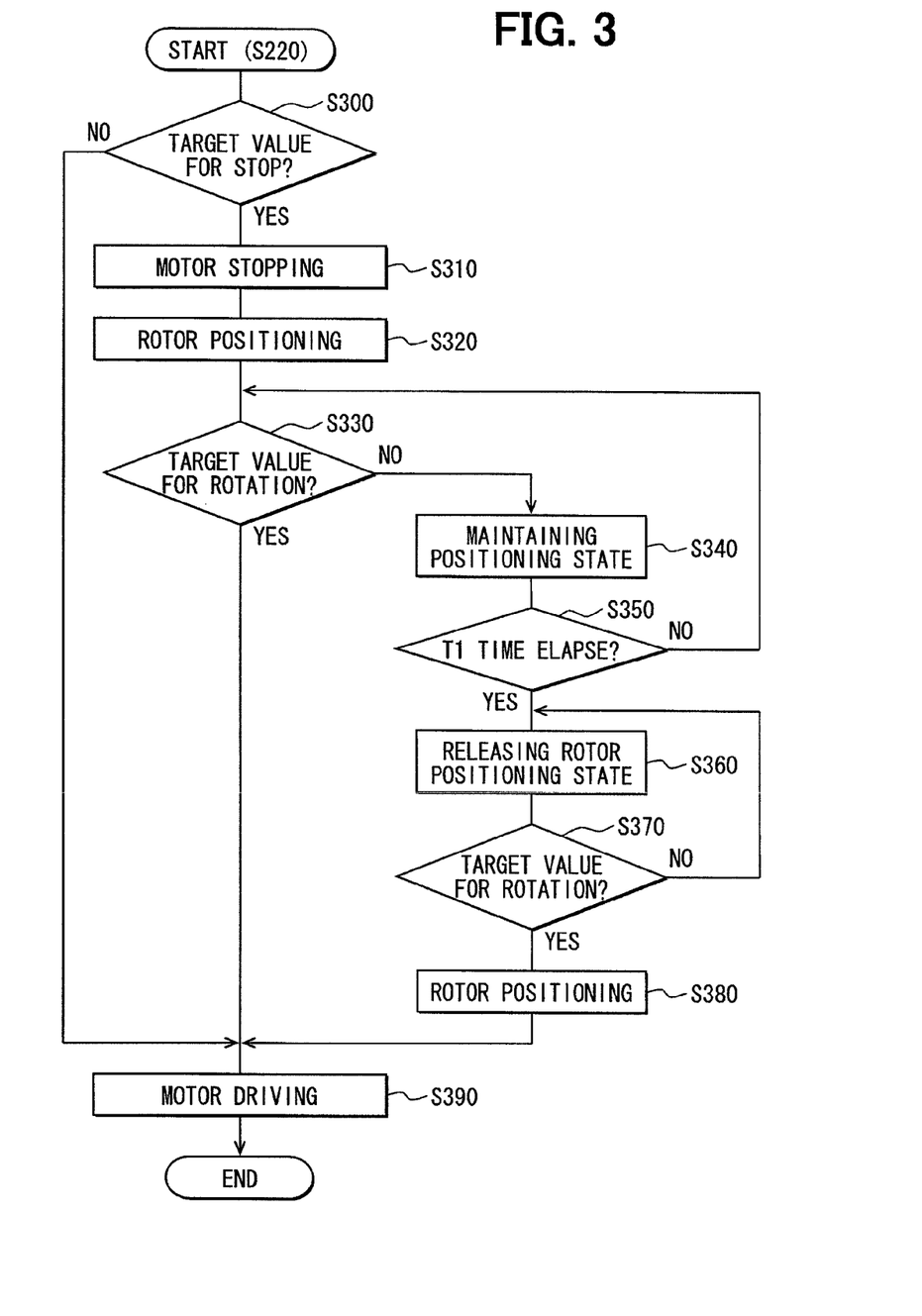
FIG. 3 is a flowchart showing details of rotation control processing in the flowchart of FIG. 2.

Control details, which the motor controller 20 is configured to perform for the brushless motor 10, will be described with reference to flowcharts of FIG. 2, FIG. 3 and signal waveform charts of FIG. 4 to FIG. 9. The processing shown in the flowchart of FIG. 2 is started to be executed when power supply to the motor controller 20 is turned on. The motor controller 20 and the main ECU 22 are supplied with electric power at the same time when the control for the brushless motor 10 need be started. At step S100, it is checked whether the induced voltages are inputted from the voltage detection section 16 thereby to check whether the brushless motor 10 is rotating. When the brushless motor 10 is rotating, the direction of rotation is also determined. In a case that the brushless motor 10 is used to drive the blower fan, the blower fan may rotate by air stream even when no operation signal for the inverter circuit 18 is outputted from the motor controller 20. As a result, the brushless motor 10 may accidentally rotate. In also a case that the brushless motor 10 is used to drive the fuel pump, the brushless motor 10 may accidentally rotate by vibration of a vehicle.

It is checked at step S110 whether the brushless motor 10 is rotating as a result of induced voltage detection at step S100. If step S110 determines that the brushless motor is rotating, step S120 is executed. If step S110 determines that the brushless motor 10 is not rotating, S150 is executed. At step S150, the rotor is positioned to the predetermined angular position by rotor positioning processing, that is, by supplying a current to at least a coil of a specified phase.

Figure 4:
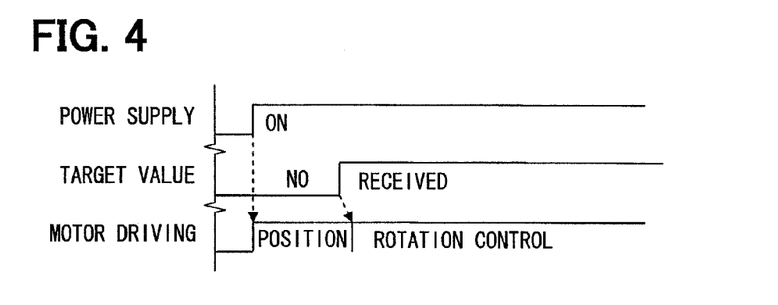
FIG. 4 is a signal waveform chart showing a case, in which the motor controller starts positioning processing before receiving a target value related to brushless motor control from a main ECU when power supply to the motor controller is turned on and the motor controller performs rotation control of the brushless motor according to the target value after finishing the rotor positioning processing.

Specifically, as shown in the signal waveform chart of FIG. 4, the motor controller 20 starts the rotor positioning processing before the target value related to control for the brushless motor 10 is received from the main ECU 22 when the brushless motor 10 is at rest at the time of turning on of the power supply to the motor controller 20. The main ECU 22 is supplied with power at the same time as the motor controller 20 and calculates the target value related to the control for the brushless motor 10 based on the signals from various sensors and switches after the power supply is turned on. Then the calculated target value is transmitted to the motor controller 20 in accordance with the predetermined communication protocol. For this reason, if communication is busy in the communication network between the main ECU 22 and the motor controller 20 for example, it sometimes takes a long time period for the motor controller 20 to receive the target value from the main ECU 22.

For this reason, the motor controller 20 performs the rotor positioning processing immediately after the power supply thereto is turned on and not after receiving the target value from the main ECU 22. Thus, the rotor positioning processing is finished or at least in the course of performing the rotor positioning processing, when the target value is received from the main ECU 22. It is thus possible to shorten the time period required until the rotation control for the brushless motor 10 is started in response to the received target value.

At step S160, it is checked whether the target value for rotation is received from the main ECU 22. If the check result at step S160 is YES, step S220 is executed. After finishing the rotor positioning processing as shown in FIG. 4, the rotation control for the brushless motor 10 is started in accordance with the received target value. This rotation control for the brushless motor 10 in accordance with the target value will be described in detail later with reference to the flowchart of FIG. 3. After the rotation control for the brushless motor 10 is started in response to reception of the target value from the main ECU 22, the motor controller 20 continues to perform the rotation control by way of step S230 based on the target value until it is determined at step S230 that the power supply is turned off.

Figure 5:
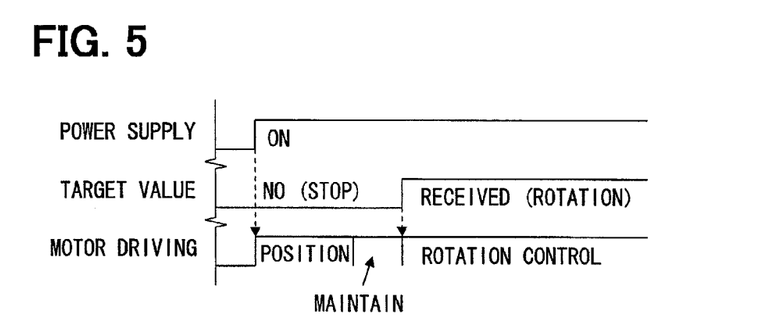
FIG. 5 is a signal waveform chart showing a case, in which a target value for rotation is not received even after the rotor positioning processing is finished and a rotor positioning state is maintained after the rotor positioning processing.

If no target value, which instructs rotation, is received before the rotor positioning processing at step S150 is finished and the check result at step S160 is NO, step S170 is executed. At step S170, the coils of all phases are grounded, the coils of all phases are connected to the power supply source or the current supply to the phase, which is specified for the rotor positioning, is continued with a low current, by outputting the operation signals GUU, GUL, GVU, GVL, GWU, GWL to the switching elements SUU, SUL SVU, SVL, SWU, SWL of the inverter circuit 18, respectively. Thus, since the rotor positioning state is maintained, that is, the rotor has already been moved to the predetermined angular position, the rotor control for the brushless motor 10 is started in correspondence to the target value immediately when the target value for rotation is received. The signal waveform chart of FIG. 5 shows a case, in which no target value for rotation is received even after the rotor positioning processing at step S150 is finished, and the rotor positioning state is maintained after the rotor is positioned. In a case shown in FIG. 5, the target value for rotation is received in a time period, during which the rotor positioning state is maintained, and the rotation control for the brushless motor 10 is started in accordance with the target value.

It is checked at step S180 whether a predetermined period (first predetermined period T1) has elapsed after starting maintaining the rotor positioning state. If the time elapse is shorter than the predetermined period, step S160 is executed again. If the time elapse is longer than the predetermined period (that is, over T1), step S190 is executed. At step S190, the rotor positioning state is released by stopping the output of the operation signals GUU, GUL, GVU, GVL, GWU, GWL to the switching elements SUU, SUL, SVU, SVL, SWU, SWL of the inverter circuit 18, respectively. The rotor positioning state is released to stop an increase in the power consumption, which will otherwise be caused if the operation signals GUU, GUL, GVU, GVL, GWU, GWL are continuously outputted without time limitation.

Figure 6:
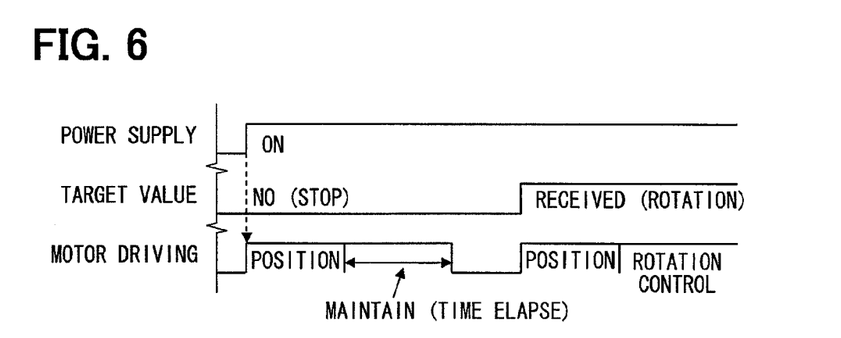
FIG. 6 is a signal waveform chart showing a case, in which the target value for rotation is not received by the motor controller during a predetermined period of maintaining the rotor positioning state after the rotor positioning processing and the rotor positioning state is released.
Figure 7:
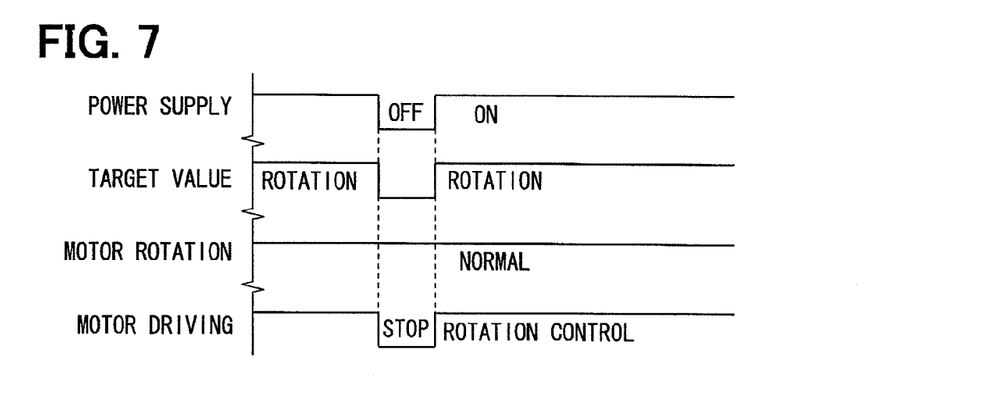
FIG. 7 is a signal waveform chart showing a case, in which rotation of the brushless motor is controlled in accordance with the target value without performing the rotor positioning processing, when the target value for rotation is received from the main ECU and the brushless motor is rotating in a normal rotation direction at time of power supply to the motor controller.
Figure 8:
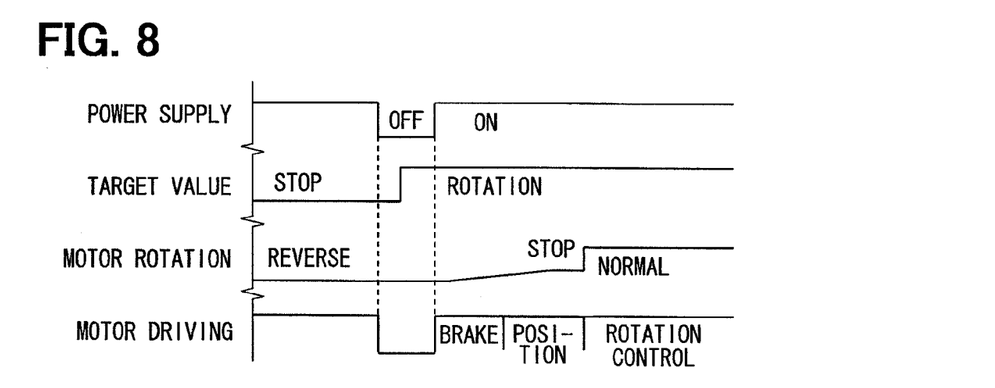
FIG. 8 is a signal waveform chart showing a case, in which rotation of the brushless motor is controlled in accordance with the target value after finishing braking processing for stopping rotation of the rotor and performing the rotor positioning processing, when the target value for rotation is received from the main ECU and the brushless motor is rotating in a reverse direction at time of power supply to the motor controller.

At step S200, it is checked whether the target value for rotation is received from the main ECU 22. If it is determined in this check processing that the target value for rotation is received, step S210 is executed. At step S210, the rotor positioning processing is executed again. Then step S220 is executed. The signal waveforms of FIG. 6 shows a case, in which the rotor positioning state is released because no target value for rotation is not received during the predetermined period of maintaining the rotor positioning state after the rotor positioning is finished. In the case shown in FIG. 6, the rotor positioning processing is performed anew in response to reception of the target value for rotation and then the rotation control for the brushless motor 10 is performed.

At step S120, which is executed in response to the check result of step S110 indicating that the brushless motor 10 is rotating, it is checked whether the target value for rotation is received from the main ECU 22. This processing is performed to check whether the power supply to the motor controller 20 is resumed soon after the power supply is turned off for a short period due to momentary interruption or momentary fall of a power supply voltage. That is, in a case that the power supply is turned off for only a short period because of the momentary interruption or momentary fall while rotation of the brushless motor 10 is being controlled in accordance with the target value, the operation signals GUU, GUL, GVU, GVL, GWU, GWL are stopped from being outputted from the motor controller 20. However, the rotor of the brushless motor 10 continues to rotate by inertia. For this reason, when the power supply to the motor controller 20 is turned off for a short period because of the momentary interruption or momentary fall but later turned on again, the brushless motor 10 is still rotating. Further, since the target value is transmitted from the main ECU 22, the motor controller 20 is capable of receiving the target value.

If the check result at step S120 is YES, the direction of rotation of the brushless motor 10 is checked at step S130. If it is determined that the brushless motor 10 is rotating in the normal (forward) rotation direction, step S220 is executed to control rotation of the brushless motor 10 in accordance with the target value for rotation without performing the rotor positioning processing. Thus, as shown in the signal waveform chart of FIG. 7, the rotation control for the brushless motor 10 can be restarted immediately in accordance with the target value for ration when the motor controller 20 returns from the short-period power-off state.

If it is determined at step S130 that the brushless motor 10 is rotating in the reverse direction, step S140 is executed to perform braking processing for stopping the brushless motor from rotating in the reverse direction. This braking processing may be performed by connecting the coils of all phases of the brushless motor 10 to the ground or to the power supply source by way of the switching elements SUU, SUL, SVU, SVL, SWU, SWL of the inverter circuit 18. Then at step S150, the rotor positioning processing is performed. Further at step S220, the rotation control processing is performed in accordance with the target value for rotation.

The brushless motor 10 rotates in the reverse direction with the target value for rotation received from the main ECU 22 in such a case as exemplified below. It is assumed that, as shown in the signal waveform chart of FIG. 8, the main ECU 22 transmits a target value for stop, which instructs stopping of the brushless motor 10, to the motor controller 20 before the short-period power-off arises in the motor controller 20. In this case, the motor controller 20 stops outputting the operation signals GUU, GUL, GVU, GVL, GWU, GWL to the switching elements SUU, SUL, SVU, SVL, SWU, SWL of the inverter circuit 18. For this reason, the brushless motor 10 is likely to rotate in the reverse direction accidentally by external force of air stream or vibration. When the target value transmitted from the main ECU 22 changes to the target value for rotation, which instructs rotation of the brushless motor 10, during the short-period power-off, the target value for rotation is received from the main ECU 22 at the time of return to the power-on state and the brushless motor 10 is rotating in reverse. In this case, the above-described braking processing is performed to stop the rotation in the reverse direction so that the rotor may be positioned to the predetermined angular position assuredly and rapidly.

Figure 9:
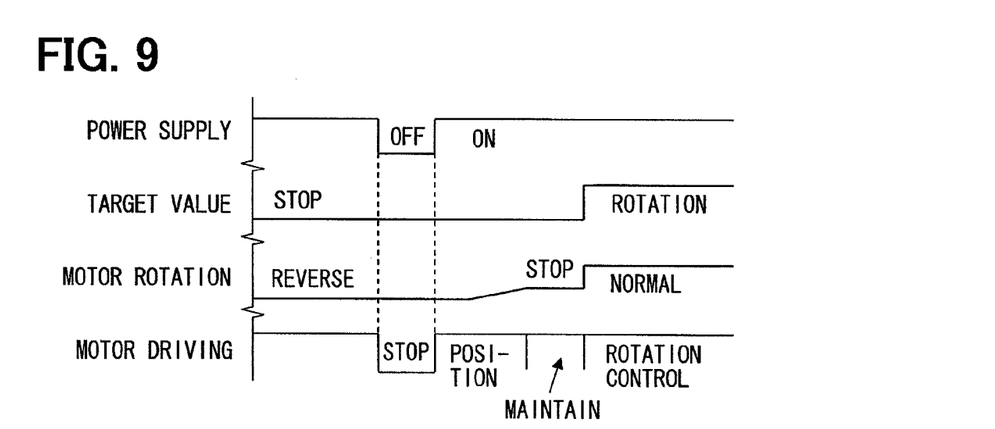
FIG. 9 is a signal waveform chart showing a case, in which the rotor positioning processing is performed, when the target value for rotation is not received from the main ECU and the brushless motor is rotating in the normal or reverse direction at time of power supply to the motor controller.

If it is determined at step S120 that the target value for rotation is not received, it is estimated that the brushless motor 10 is rotating in the normal rotation direction or the reverse direction by the external force of air stream or vibration when the power supply to the motor controller 20 is turned on. Therefore, in this case, step S150 is executed to perform the rotor positioning processing to prepare for the rotation control, which is started in response to reception of the target value for rotation. The signal waveform chart of FIG. 9 shows such a case. That is, in the case shown in FIG. 9, although the power supply to the motor controller 20 falls for a short period due to momentary interruption, only the target value for stopping of the brushless motor 10 is outputted from the main ECU 22. For this reason, even when the brushless motor 10 is rotating in the reverse direction, for example, the braking processing is not performed but only the rotor positioning processing is performed. This rotor positioning state is maintained thereafter for the predetermined period.

Other than the case shown in FIG. 9, the rotor positioning processing of step S150 is performed through the processing of step S120, when the brushless motor 10 is rotating in the normal direction or the reverse direction, for example, when the power supply to the motor controller 20 is turned on normally.

The rotation control for the brushless motor 10 performed at step S220 of FIG. 2 will be described in detail with reference to the flowchart of FIG. 3.

It is checked at step S300 whether the target value received from the main ECU 22 instructs rotation stop of the brushless motor 10. If it is determined at this check processing that the target value instructs the rotation stop, step S310 is executed. If it is determined that the target value does not instruct the rotation stop, step S310 is executed.

At step S310, the brushless motor 10 is stopped from rotating by stopping outputs of the operation signals GUU, GUL, GVU, GVL, GWU, GWL to the switching elements SUU, SUL, SVU, SVL, SWU, SWL of the inverter circuit 18. In this instance it is possible to perform the braking processing of step S140 in the flowchart of FIG. 2.

At step S320, rotor positioning processing is performed in the similar manner as step S150 in the flowchart of FIG. 2. That is, the rotor positioning processing is performed not only when the power supply to the motor controller 20 is turned on but also when the brushless motor 10 stops in response to the instruction of rotation stop of the brushless motor 10. Thus it is possible to prepare for starting the rotation control for the brushless motor 10 in response to reception of the target value for rotation.

After the rotor positioning processing, processing of step S330 to step S380 is executed. Since this processing is the same as that of steps S160 to S210 in the flowchart of FIG. 2, no more description is made. It is thus possible to provide the similar operation and advantage as those, which are provided when the power supply is turned on, even at time of the rotation stop by performing, after the rotor positioning processing, the similar processing as when the power supply is turned on. At step S390, the rotation of the brushless motor 10 is controlled in accordance with the target value received from the main ECU 22.

The brushless motor control system is not limited to the embodiment described above but may be implemented in various modified embodiments.

For example, in the above-described embodiment, the rotor positioning processing is performed anew upon reception of the target value for rotation, when the rotor positioning state is released after maintaining the rotor positioning state for the predetermined period by the processing of steps S190 to S210 in the flowchart of FIG. 2.

Figure 10:
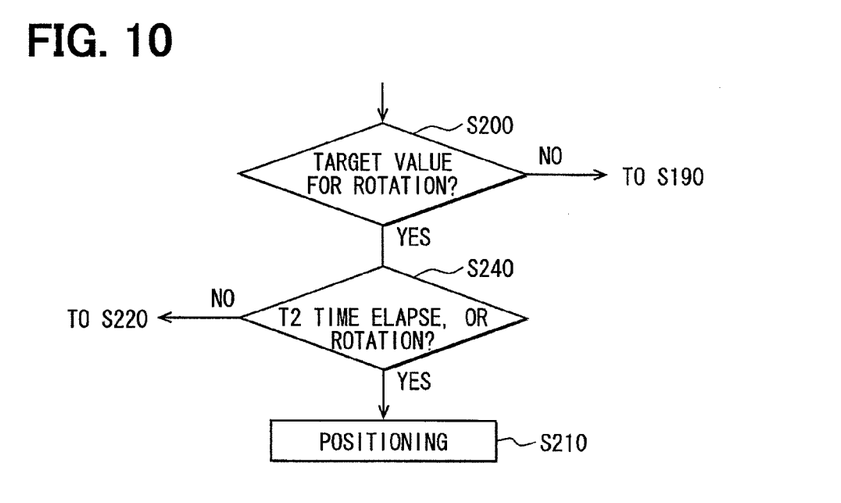
FIG. 10 is a flowchart showing processing according to a modification of the embodiment.
Figure 11:
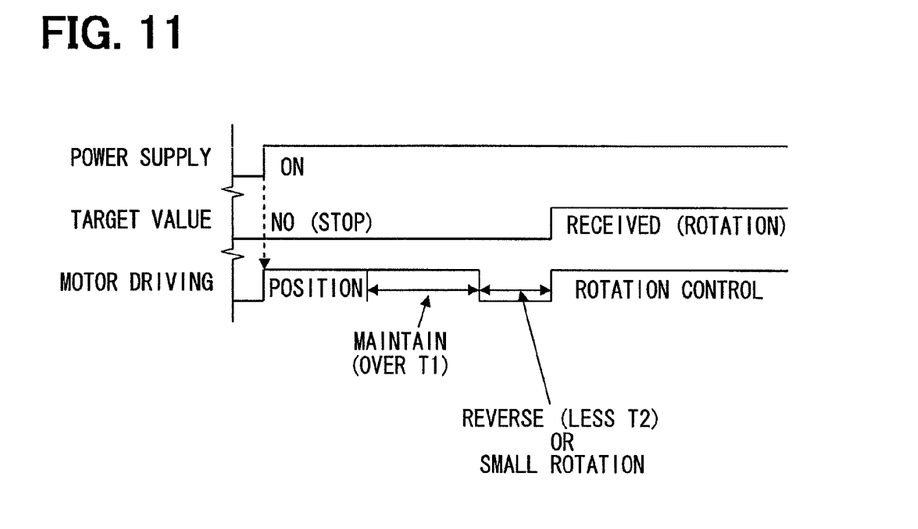
FIG. 11 is a signal waveform chart showing an operation performed by processing shown by the flowchart of FIG. 10.

However, as shown in FIG. 10, when it is determined at step S200 that the target value for rotation is received, step S240 may be executed. At step S240, it is checked whether a second predetermined period T2 (for example, several tens of microseconds) elapsed after releasing of the rotor positioning state or the rotor rotated a predetermined angle or more. Only when it is determined that the second predetermined period elapsed or the rotor rotated the predetermined angle or more, the rotor positioning processing of step S210 may be performed. In this case, as shown in the signal waveform chart of FIG. 11, the rotor is estimated to be maintaining the angular position, to which the rotor is positioned, when elapse of time is shorter than the second predetermined period or rotation of the rotor is less than the predetermined angle in a period from releasing of the rotor positioning state to starting of the rotation control for the brushless motor. For this reason, the rotation control for the brushless motor 10 may be started without performing the rotor positioning processing again. According to this modified embodiment, it is possible to determine accurately whether the rotor positioning need be performed anew and to perform the rotor positioning processing only when needed. As a result, the brushless motor control can be started earlier.

In the above-described embodiment, the phase of coil, which is supplied with the current at the time of rotor positioning processing, is assumed to be fixed to the specified phase. However, the phase of coil, which is supplied with the current for positioning need not be fixed but may be varied each time the rotor positioning is performed. It is thus possible to suppress deterioration of certain circuit components or circuit parts, which may arise when only a specified phase coil in the stator coil set is used, and hence prolong the life of the control system. In a case that the phase of coil, which is supplied with a current at the time of rotor positioning, is varied, the phases may be varied in a predetermined order or at random so that all parts of the circuit may be used equally.

In the above-described embodiment, the brushless motor 10 is assumed to be driven in one direction (normal rotation direction) by the motor controller 20. However, the brushless motor 10 may be a reversible motor, which can be driven in both directions by the motor controller 20. In this case, a driving direction may be received additionally from the main ECU 22 as a part of the target value related to control for the brushless motor 10, and the above-described processing may be performed by setting the received driving direction as the normal rotation direction.

What is claimed is:

1. A control system for a brushless motor having a rotor made of a permanent magnet set and a stator coil set of plural phase coils, the control system comprising:
   a main ECU configured to determine a target value related to control for the brushless motor;
   a position detection section configured to detect a rotation position of the rotor; and
   a motor controller configured to perform rotor positioning processing for the rotor by supplying a current to a specified phase coil of the stator coil set, and to switch over phase coils of the stator coil set, to which a current is supplied, in accordance with the rotation position of the rotor detected by the position detection section so that rotation of the brushless motor is controlled in accordance with the target value outputted from the main ECU,
   wherein
   the motor controller is configured to perform the rotor positioning processing by supplying the current to at least the specified phase coil of the stator coil set before receiving the target value from the main ECU, when power supply is turned on,
   in a period after the current is supplied to the specified phase coil of the stator coil set for rotor positioning until the target value for rotation of the brushless motor is received from the main ECU,
   the motor controller maintains the rotor positioning state of the rotor by performing at least one of grounding all phase coils of the stator coil set, connecting the all phase coils of the stator coil set to a power supply source and maintaining supply of a low current to the specified phase coil of the stator coil set,
   the motor controller maintains the rotor positioning for a first predetermined period,
   the motor controller releases the rotor positioning, when the target value instructing a restart of rotation of the brushless motor is not received from the main ECU in the first predetermined period, and
   when the target value instructing the restart of rotation of the brushless motor is received from the main ECU after the rotor positioning state is released,
   the motor controller determines whether the current supply needs to be performed again in accordance with a time period, which is from releasing of the current supply state to a reception of the target value, or in accordance with rotation or non-rotation of the rotor in the time period.

2. The control system according to claim 1, wherein:
   the main ECU is configured to transmit the target value to the motor controller by communication with the motor controller according to a predetermined communication protocol.

3. The control system according to claim 1, wherein:
   in a case that, when the power supply is turned on, the target value has already been received and the rotor is rotating in a direction to be controlled by the target value,
   the motor controller supplies no current to the specified phase coil for rotor positioning, and instead switches over current supply phase coils of the stator coil set in accordance with the rotation position of the rotor detected by the position detection section for controlling rotation of the brushless motor in accordance with the target value.

4. The control system according to claim 1, wherein:
   in a case that, when the power supply is turned on, the target value has already been received and the rotor is rotating in an opposite direction relative to a direction to be controlled by the target value,
   the motor controller supplies the current to the plural phase coils of the stator coil set for stopping rotation of the rotor in the opposite direction and supplies the current to the specified phase coil of the stator coil set for rotor positioning, and
   the motor controller then switches over current supply phase coils of the stator coil set in accordance with the rotation position of the rotor detected by the position detection section for controlling rotation of the brushless motor in accordance with the target value.

5. The control system according to claim 1, wherein:
   when the target value instructing a stop of the brushless motor is outputted from the main ECU and the brushless motor is stopped in response to the target value,
   the motor controller supplies the current to the specified phase coil of the stator coil set for rotor positioning.

6. The control system according to claim 1, wherein:
   the motor controller starts switching over current supply phase coils of the stator coil set to control the rotation of the brushless motor in accordance with the target value without performing the current supply for rotor positioning, when a period required to receive the target value after the releasing of the current supply state to the specified phase coil is shorter than a second predetermined period or rotation of the rotor in excess of a predetermined angle is not detected; and
   the motor controller performs the current supply for rotor positioning and then starts switching over the current supply phase coils of the stator coil set based on the rotation position of the rotor detected by the position detection section for controlling the rotation of the brushless motor in accordance with the target value, when the period required to receive the target value is longer than the second predetermined period or the rotation of the rotor in excess of the predetermined angle is detected.

7. The control system according to claim 1, wherein:
   the motor controller varies the phase coil of the stator coil set, to which is the current is supplied for rotor positioning, each time the rotor positioning is performed.

8. The control system according to claim 1, wherein:
the position detection section detects the rotation position of the rotor based on induced voltages of the plural phase coils of the stator coil set.

9. The control system according to claim 1, wherein:
the motor controller determines whether the current supply needs to be performed again in accordance with the time period, which is from releasing of the current supply state to the reception of the target value.

* * * * *